(12) United States Patent
Schubert (10) Patent No.: US 6,994,296 B2
(45) Date of Patent: Feb. 7, 2006

(54) APPARATUS AND METHOD FOR MANEUVERING OBJECTS IN LOW/ZERO GRAVITY ENVIRONMENTS

(76) Inventor: Peter J. Schubert, 310 W. Greyhound Pass, Carmel, IN (US) 46032

(*) Notice: Subject to any disclaimer, the term of this patent is extended or adjusted under 35 U.S.C. 154(b) by 0 days.

(21) Appl. No.: 10/709,960

(22) Filed: Jun. 9, 2004

(65) Prior Publication Data

US 2005/0077433 A1    Apr. 14, 2005

Related U.S. Application Data

(60) Provisional application No. 60/320,269, filed on Jun. 13, 2003.

(51) Int. Cl.
*B64G 1/00* (2006.01)

(52) U.S. Cl. .................. 244/171.5; 244/166

(58) Field of Classification Search ............ 244/161, 244/166, 172, 63, 158 R, 171.5, 171.1, 158.1, 244/172.4
See application file for complete search history.

(56) References Cited

U.S. PATENT DOCUMENTS

| | | | | |
|---|---|---|---|---|
| 3,429,524 A | * | 2/1969 | Buckingham et al. | 244/166 |
| 3,504,868 A | * | 4/1970 | Engelberger | 244/172 |
| 4,582,277 A | * | 4/1986 | von Tiesenhausen | 244/161 |
| 5,305,974 A | * | 4/1994 | Willis | 244/158 R |
| 6,193,194 B1 | * | 2/2001 | Minovitch | 244/172 |
| 6,634,603 B2 | * | 10/2003 | Cooper | 244/166 |

* cited by examiner

*Primary Examiner*—Galen Barefoot
(74) *Attorney, Agent, or Firm*—Gary M. Hartman; Domenica N. S. Hartman; Hartman & Hartman (57) ABSTRACT

An apparatus and method that make use of electromagnetic energy to maneuver an object, such as stop, slow, and/or divert a vessel or projectile in low and zero-gravity environments. The apparatus comprises an element capable of generating a magnetic field in the zero or low-gravity environment, and an object capable of electromagnetically interacting with the magnetic field so that the object's speed and/or trajectory is altered when moving in proximity to the magnetic-field generating element. As such, the method entails maneuvering an object in a zero or low-gravity environment by generating a magnetic field in the zero or low-gravity environment, and then moving the object in proximity to the magnetic field such that the magnetic field alters the trajectory and/or speed of the object.

41 Claims, 6 Drawing Sheets

APPARATUS AND METHOD FOR MANEUVERING OBJECTS IN LOW/ZERO GRAVITY ENVIRONMENTS

CROSS REFERENCE TO RELATED APPLICATIONS

This application claims the benefit of U.S. Provisional Application No. 60/320,269, filed Jun. 13, 2003.

BACKGROUND OF INVENTION

1. Field of the Invention

The present invention generally relates to the general field of rocketry, orbital transfers and satellite station-keeping, as well as space vessel attitude control. More particularly, this invention relates to an apparatus and method for maneuvering objects in low and zero-gravity environments using electromagnetic forces.

2. Description of the Related Art

The current state of the art in orbital transfers and station keeping involve reaction rockets using a variety of fuels, either chemical or electrostatic acceleration. Chemically-fueled rockets require that fuel be brought along, and this limits the performance of the rocket through the rocket equation.

$$\Delta V = I_{sp} \cdot g \cdot \ln(M_o/M_f)$$

where $\Delta V$ is the velocity change given the specific impulse of the rocket motor ($I_{sp}$), the gravitational constant (g), and the logarithm of the ratio of weights before ($M_o$) and after ($M_f$) the burn.

It would be desirable if alternative techniques were available to stop, slow, and divert objects in low-gravity (orbital) and zero-gravity environments.

SUMMARY OF INVENTION

The present invention provides an apparatus and method that make use of electromagnetic energy to maneuver an object, such as stop, slow, and/or divert a vessel or projectile, in low and zero-gravity environments. The apparatus comprises means for generating a magnetic field in the zero or low-gravity environment, and an object capable of electromagnetically interacting with the magnetic field so that the object's speed and/or trajectory is altered when moving in proximity to the generating means. As such, the method of this invention entails maneuvering an object in a zero or low-gravity environment by generating a magnetic field in the zero or low-gravity environment, and then moving the object in proximity to the magnetic field and sufficiently close to the generating means such that the magnetic field alters the trajectory and/or speed of the object.

A significant advantage of this invention is that maneuvering of an object can be exclusively performed using electromagnetic forces, which offer numerous advantages over chemically-fueled and electrostatically-accelerated rockets. The invention achieves efficient orbital injection and ejection without the need for chemical rockets, and can be adapted to use inexhaustible solar energy and/or harvest energy from decelerating/deflecting objects. The invention is adapted to perform either or both of two general classes of orbital maneuver, namely, altering the speed or trajectory of an object. The first class encompasses catching (decelerating) and launching (accelerating) objects, while the second involves deflecting an object, such as forcing an object into or out of an orbital path. In combination, the invention provides a general purpose orbital transfer system and method. For example, a payload launched from the Moon can be deflected into a geosynchronous orbit around the Earth, and then ejected from orbit and accelerated back to the Moon. Fine control over the electromagnetic forces employed in these maneuvers is possible through control circuitry with feedback sensors, such that objects can be delivered, captured and placed in orbit with precision.

Other objects and advantages of this invention will be better appreciated from the following detailed description.

DETAILED DESCRIPTION

Figure 1:
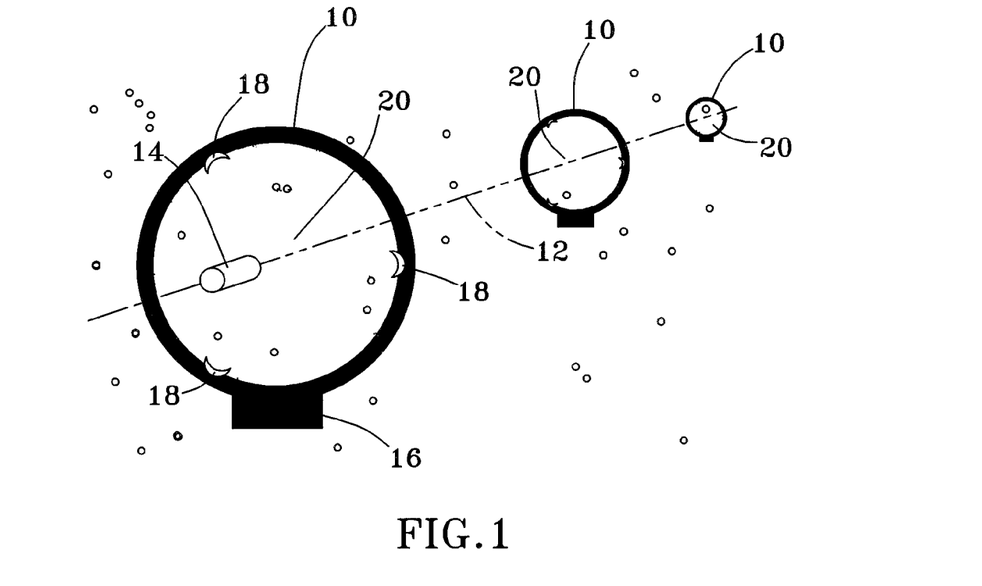
FIG. 1 schematically represents a plurality of orbiting deceleration coils aligned along the path of a payload in accordance with an embodiment of this invention.

General concepts of the invention can be described in reference to FIG. 1, which depicts three orbiting conductive rings or coils 10 aligned in a substantially straight line along the trajectory 12 of a traveling object, which may be a canister, projectile, vessel, etc., hereafter simply referred to as a payload 14. The coils 10 are represented as being generally annular-shaped, though other shapes are possible. The term "coil" is used herein as any structure capable of producing a magnetic field, and may be a single loop or a winding of multiple concentric loops, as will be evident from the Figures. The magnetic fields produced by the coils 10 are generated with the intent to exert an electromagnetic force on the moving payload 14. The payload 14 is adapted to electromagnetically interact with the magnetic fields, and therefore is formed to contain a ferrous material, hold a static charge, or contain an electromagnet, e.g., superconducting or electric with control circuitry and some form of energy storage device, such as a capacitor or battery. As the payload 14 passes through or near each coil 10, the electromotive force (emf), or Lorentz force, applies a force to the payload 14. More particularly, the coils 10 as arranged in FIG. 1 apply a deceleration force to the payload 14. In an alternative embodiment that will be described in reference to FIGS. 7 and 8, the payload 14 travels past the coils 10 (instead of through them), causing the trajectory 12 of the payload 14 to be bent along the radius of a circle or spiral for the purpose of diverting the payload 14 from or into an orbit. In either case, a plurality of coils 10 is believed to be generally desirable to spread the forces across a larger period of time, to spare the payload 14, and reduce design constraints on the size, accuracy and power needed in the coils 10.

The process of altering the orbit of a high-velocity projectile requires precise control and accurate sensing capabilities. Sophisticated control electronics 16 is therefore an important aspect of the invention, including the use of sensors for sensing position, velocity, and magnetic fields. The control electronics 16 is preferably coupled to the other components of the system either rigidly, through flexible connections, or wirelessly as may be demanded by design considerations. Because navigation and station-keeping are important, each coil 10 is also preferably provided with station-keeping and attitude control devices 18 to apply optimal velocity and timing to correctly adjust the velocity of the payload 14.

When the payload 14 enters the magnetic field generated by one of the coils 10, a back-emf pulse is generated that is aligned with the linear direction of the trajectory 12 of the payload 14. As will be discussed in reference to FIGS. 5 and 6, this energy back into the system (Lenz's law) can be captured and stored in a variety of ways. For example, the stored energy can be used to reduce the power requirements for the entire system, and also used as a means to provide propulsive thrust to the payload 14. In this way, the same coils 10 can be used for acceleration as well as deceleration, which in combination with the ability to deflect the payload 14 enables fine control of orbital transfer.

In view of the above, an arrangement of components is preferably employed to yield an apparatus capable of directing the momentum of a traveling body, such as the payload 14 of FIG. 1. The following discussion is based on the usage of such an apparatus in orbit, and certain specific advantages follow from this. However, the same principles could be used in nearly any environment. Also as discussed above, two operational embodiments of the invention will be discussed, with the principle acting component of each embodiment comprising one or more magnetic fields generated by, for example, coils capable of sustaining a large electric current and suitably configured to create a magnetic field. According to the first operational embodiment depicted in FIG. 1 and described in greater detail in FIGS. 2 and 3, the payload 14 passes through the central (axial) openings 20 of one or more coils 10. By fabricating the payload 14 to contain one or more ferrous materials (such as iron or iron-rich minerals like magnetite), the coil current in the coil 10 can be adjusted to impart a force on the payload 14 that slows the payload 14. Such an embodiment is a linear approach to the invention, operates along substantially straight lines, and may require one or more coils 10. According to the second operational embodiment described in reference to FIGS. 7 through 9, the payload 14 is passed across the openings 20 of the coils 10. As it passes, the payload 14 is pulled toward the coil 10 or pushed away from the coil 10, causing its trajectory 12 to be bent. Through the use of several such coils 10 judiciously spaced along the intended trajectory 12, the speeding payload 14 can be coaxed to a new, more desirable orbit. Each of these approaches will be described and then their application described. A discussion of various alternative implementations and applications will build upon these foundations.

Figure 2:
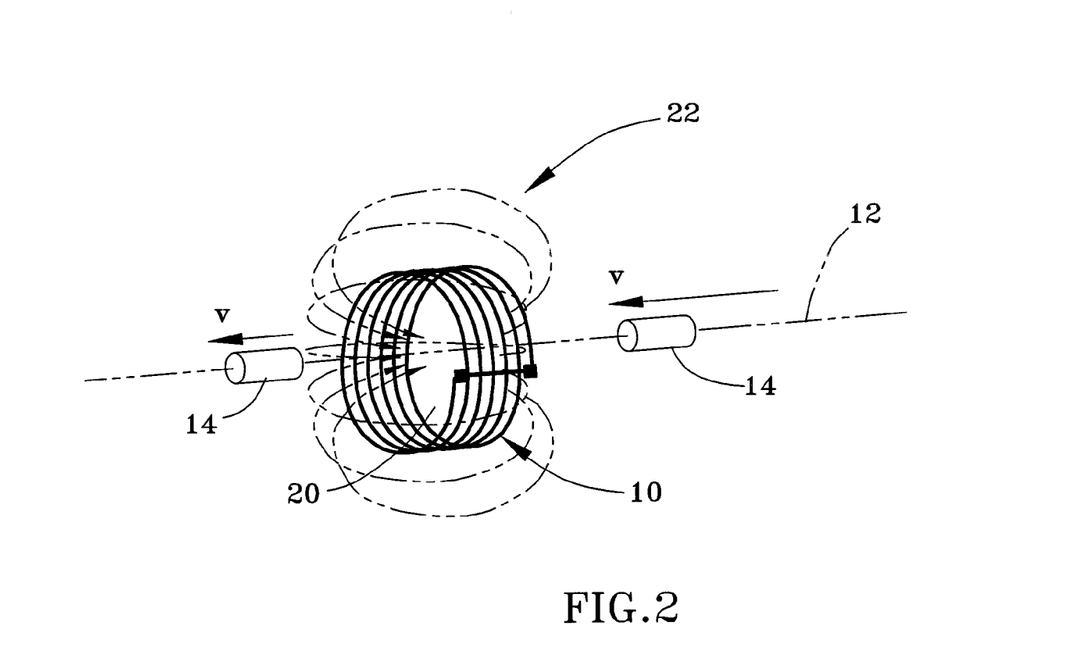
FIG. 2 demonstrates an inductive deceleration operation performed with a magnetic field in accordance with an embodiment of the invention.

The first operational approach, which makes use of what is referred to herein as an inductive deceleration (ID) apparatus 22, is depicted in FIG. 2 with continued reference to the coil 10 and payload 14 originally discussed in reference to FIG. 1. It is a well-known principle of the physics of electromagnetism that a current through a coil produces a magnetic field. The lines of force of a magnetic field generated by the coil 10 in this manner are depicted in dashed lines in FIG. 2. Similar to the principles of an electric solenoid, when the payload 14 (or another magnetic material) enters the magnetic field, a force is applied to the payload 14. The magnitude of the force is determined by the current, the number of winds, the area of the coil 10, and a number of secondary factors. The magnitude of the magnetic field force is derived from a calculation including the mass of the payload 14 and its starting and desired velocity vectors. The goal of the ID apparatus 22 is to modify the velocity of the payload 14. Depending on design considerations and economics, a single coil 10 might be preferable, or it may be that an apparatus 22 comprising a series of individual coils 10 is optimum.

Another alternative for payload design is to use a conventional electromagnet in the form of one or more coils of an electrically-conductive material. Electric energy can be stored and possibly harvested en route by solar cells until contact is made with the ID apparatus 22. The charge would be driven through the coils, generating a momentary magnetic field that provides greater stopping power for a given magnetic field. This method would require communications and a more expensive payload 14 than merely iron, but could be operated at higher speeds, which may be desirable under certain conditions.

Another alternative for payload design is to use a conventional electromagnet in the form of a coil 10 of an electrically-conductive material. Electric energy can be stored and possibly harvested en route by solar cells until contact is made with the ID apparatus 22. The charge would be driven through the coils 10, generating a momentary magnetic field that provides greater stopping power for a given magnetic field. This method would require communications and a more expensive payload 14 than merely iron, but could be operated at higher speeds, which may be desirable under certain conditions.

Figure 3:
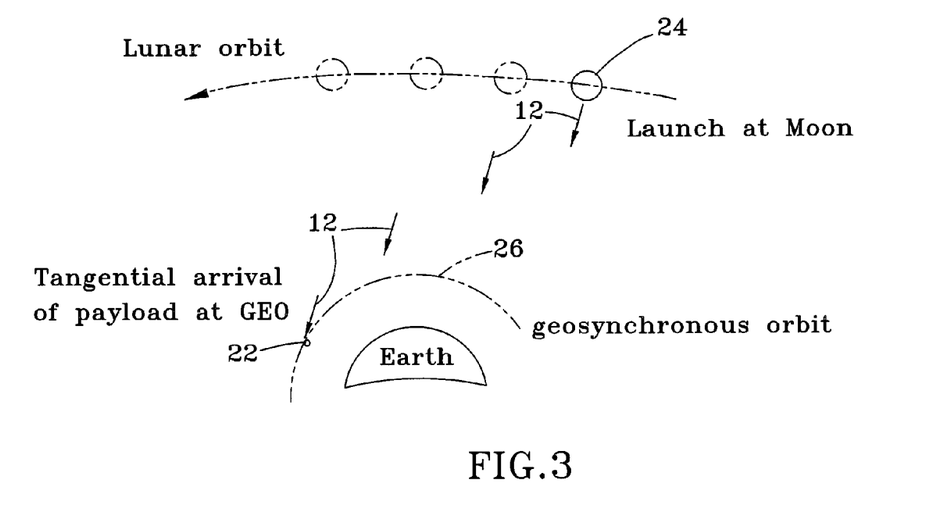
FIG. 3 depicts a tangential capture scheme that can be performed with one or more magnetic fields generated in accordance with FIG. 2.

Because it utilizes a linear technique, the ID apparatus 22 of FIG. 2 is ideally suited for orbital transfers arriving on a tangent. In fact, the ability to set up a tangential trajectory makes inductive deceleration ideally suited for low time-of-travel operations. To illustrate inductive deceleration in the embodiment of this invention, FIG. 3 depicts a payload launched from the Moon 24 by some means (perhaps chemical or electromagnetic, such as a mass-driver or rail-gun) and targeted at the ID apparatus 22 in a geosynchronous Earth orbit (GEO) 26, a preferred spot for many satellite applications. The launch velocity from the Moon 24 must first exceed the lunar escape velocity, typically at a much higher speed because the orbital velocity of GEO is approximately 3.2 times that of lunar orbital velocity. This is determined through the satellite equation:

$$v^2 = GM/r$$

where G is the gravitational constant, M is the mass of the Earth, and r and v are the radius and velocity, respectively, of the orbit of a satellite. When a payload is launched from the Moon 24 towards GEO 26, its velocity relative to Earth's center will be the sum of the Moon's velocity and its own launch velocity. If the launch is aimed and timed properly, the trajectory 12 can be placed so that it very nearly lines up on a tangent to the GEO 26, as depicted in FIG. 3. The arrows in FIG. 3 show the approximate trajectory 12 of the payload as seen from the Solar System north over a fixed Earth center. The length of each arrow indicates the speed of the projectile vector at that location. The angle and speed of the launch from the Moon 24 was chosen so that upon arrival at GEO 26, the velocity vector is nearly perfectly on a tangent with GEO 26. The ID apparatus 22, acting linearly as described above, is in position to absorb the excess velocity of the payload's motion. The coil 10 (or coils 10) are positioned and designed such that the payload's new velocity would be identical to the geosynchronous orbit, effectively coming to rest from the perspective of an object already in GEO 26.

Figure 4:
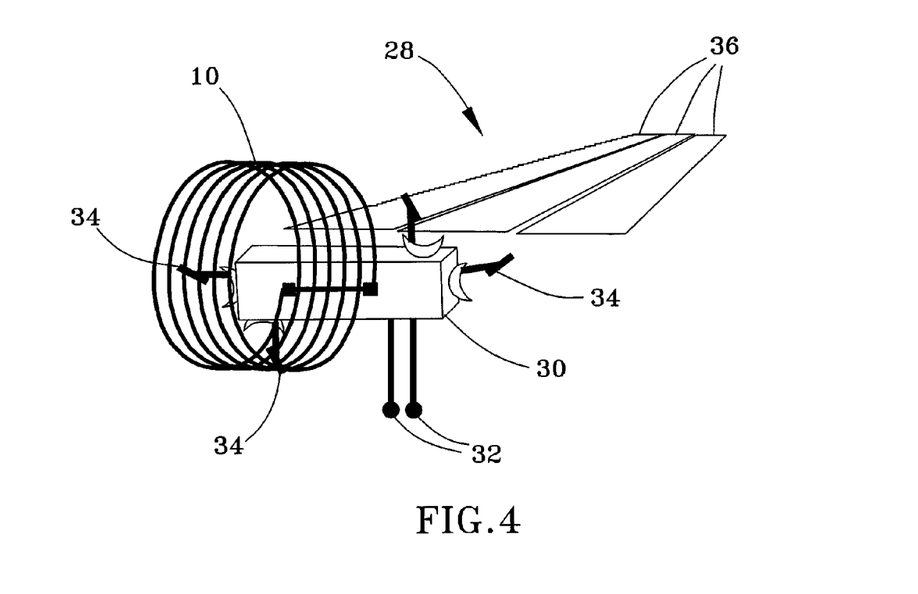
FIG. 4 represents an apparatus for performing any one of the operations depicted in FIGS. 1 through 3.

There is a certain amount of momentum transfer between the payload 14 and the coils 10 as the payload is slowed. In other words, the act of slowing the payload 14 will tug the apparatus 22 in the direction of the payload's velocity vector. Important design considerations include the mass-power tradeoff in the design of the coil 10 and its power source, and also the tradeoff between high inertia and rapid return-to-station attitude adjustment. FIG. 4 shows one possible configuration for a coil assemblage 28 for the ID apparatus 22, including a coil 10 (comprising a number of conductive windings), a controller box 30 (which may also include communications and energy storage), antennae 32 for communications, station-keeper thrusters 34 to maintain a desired orbit and attitude, and solar panels 36 to provide electrical power. Connections can be rigid, flexible, or wireless as needed to optimize overall system performance.

Alignment of the payload 14 and the coil 10 of the assemblage 28 is of critical importance. This alignment is facilitated by accurate aiming of the launched payload 14 or accurate determination of its trajectory 12 after launch. If the payload 14 does not have a magnetic field of its own, the current state-of-the-art in orbital mechanics can predict the trajectory of the payload 14 from, for example, the Moon to, for example, GEO. However, even with fine control over the launch together with precision measurements of the trajectory 12, there may be other forces that cause a deviation from an ideal trajectory. For that reason, the ID apparatus 22 preferably has the capability to propitiously position each of its coil assemblages 28 with respect to the incoming payload 14.

Figure 10:
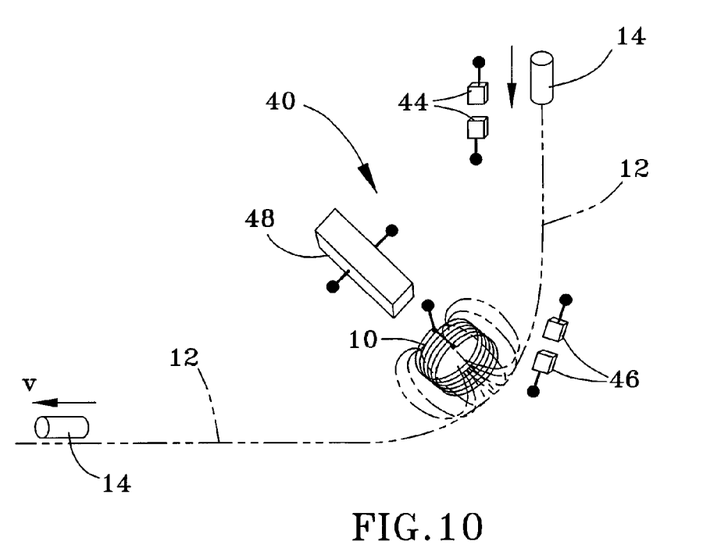
FIGS. 10 and 11 schematically represent a control system for performing a payload deflection operations.
Figure 11:
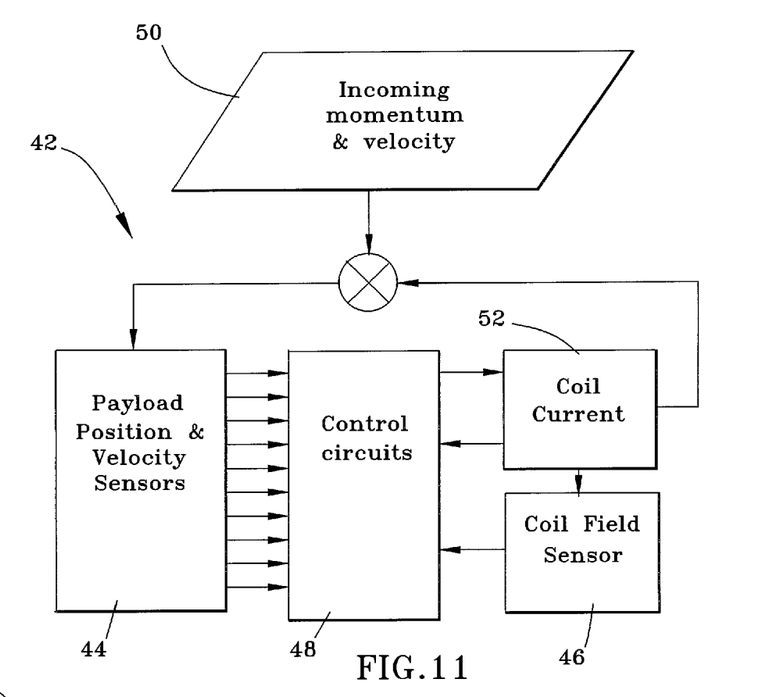
Figure 12:
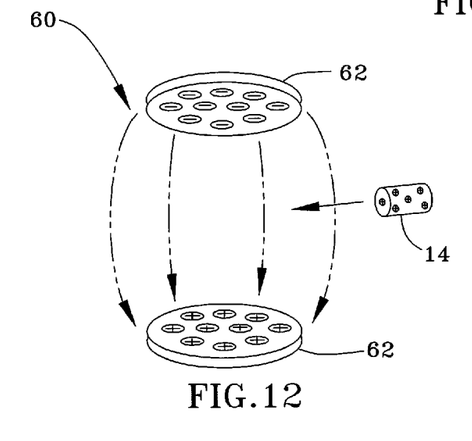
FIGS. 12 and 13 represent a deflection operation that can be performed with electric fields in accordance with another embodiment of the invention.
Figure 13:
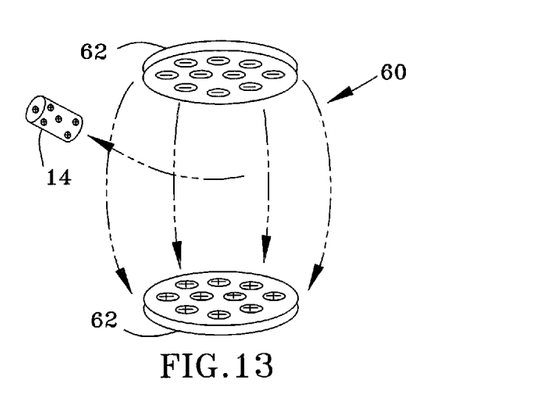

The coils 10 and coil assemblages 28 shown in FIGS. 1 through 4 must be aligned properly with the approaching payload to maximize the effectiveness of the desired velocity modification. This will, in general, involve motion about six degrees of freedom: linear translation in three dimensions and rotational motions in three dimensions. In addition to proper attitude positioning, it may also be desirable for the coils 10 to have a velocity relative to the desired orbit. This additional velocity, which might be provided by the station-keeper thrusters 26 shown in FIG. 4 or by separate thrusters (not shown), reduces the requirements for electric currents and provides greater flexibility to optimize system performance based on relative capabilities of the apparatus" components. A generalized control system for the entire system is depicted in FIGS. 10 and 11, which will be discussed below.

Figure 5:
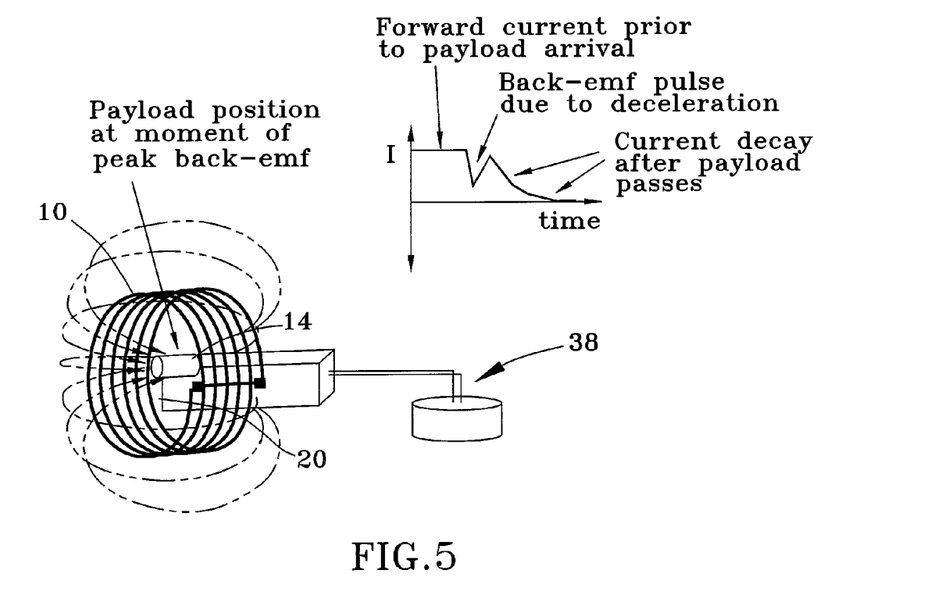
FIGS. 5 and 6 represent energy conversion and storage during capturing of a payload and acceleration of a payload using the stored energy in accordance with a preferred aspect of the invention.

As previously noted, a back-emf pulse is induced in the coil 10 as the ferrous or magnetic-containing payload 14 passes through its magnetic field. This reverse power can be captured, or harvested, through appropriate power circuitry and conditioned for an appropriate use. One such use is to charge up a capacitor, a battery, or other known storage mechanism for electrical energy. This power can be reserved until the arrival of another payload and used to generate the forward current, thereby easing the power demands of the overall system and minimizing the amount of momentum change experienced by the coil assemblage 28. To illustrate, FIG. 5 shows the moment in time when the payload 14 passes through the center of the opening 20 of the coil 10. The graph indicates current flow (I) through the coil 10 over time, showing first the steady-state current needed for the deceleration field. Next, a reverse current spike appears due to the back-emf induced at the arrival of the payload 14, as depicted in FIG. 5. Thereafter, a drop-off or decay of current occurs as the magnetic field has completed its work and is shut down. FIG. 5 shows how this excess current can be captured, for example by using a level-shifted diode or high-pass filter, and then saved in an electrical energy storage unit 38, such as one or more capacitors, batteries, superconducting electromagnets, etc.

A second use for the back-emf power surge is to power certain high-voltage devices that might do useful work for the apparatus 22. Some examples might be to fire the station-keeper thrusters 34 or attitude-positioning thrusters (not shown) to immediately help restore a desirable speed and altitude after the encounter with the moving payload 14. Other uses might include driving pumped lasers, which could be applied to do useful work on the apparatus 22.

Figure 6:
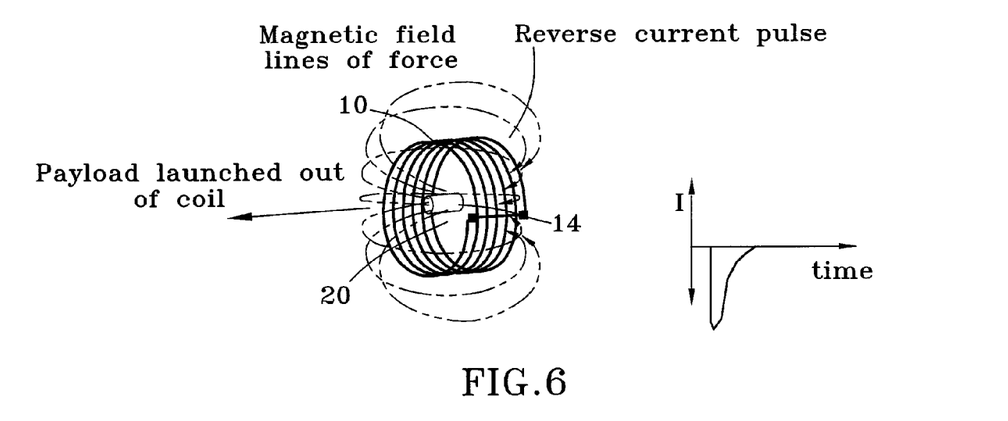

FIG. 6 represents usage of the harvested back-emf power to accelerate the payload 14 (or an empty container) to perform station-keeping, perform inter-orbital transfers, etc. For this purpose, the stored charge, possibly augmented by solar power absorbed by the solar panels 36 shown in FIG. 4, is used to initiate a magnetic field that imparts a force to the payload 14. This might be accomplished either by reversing the current direction, which would be convenient but not necessarily simple, or by simply turning the coil assemblage 28 around and restarting the current in a forward direction. With this capability, an installation of the coil assemblage 28 using ID technology would facilitate a local distribution center where high-speed payloads are slowed and then delivered around the GEO trace, a fertile land in the desert of space 185,000 miles long.

Figure 7:
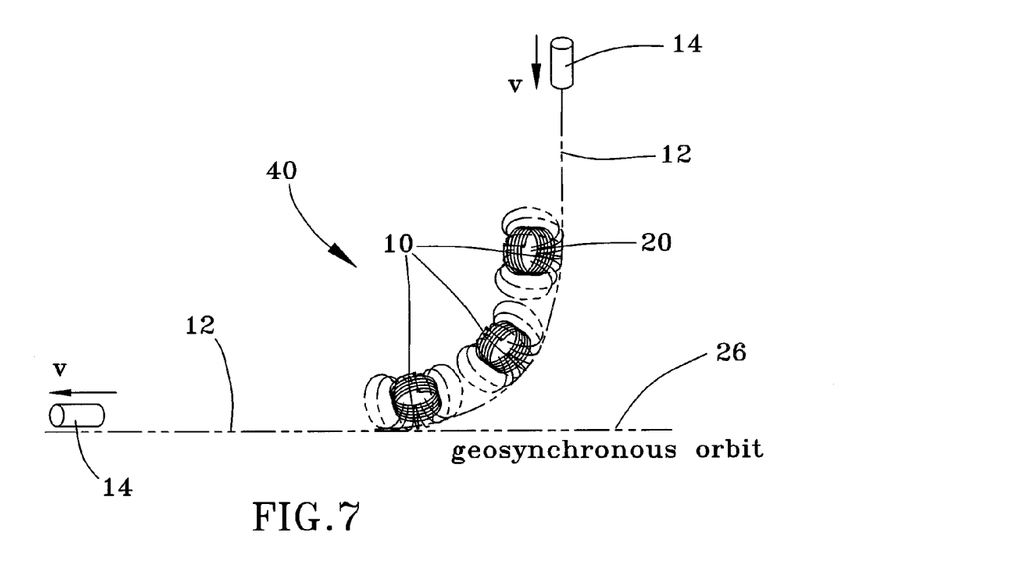
FIGS. 7 and 8 demonstrate deflection operations that can be performed with multiple magnetic fields in accordance with the invention.
Figure 8:
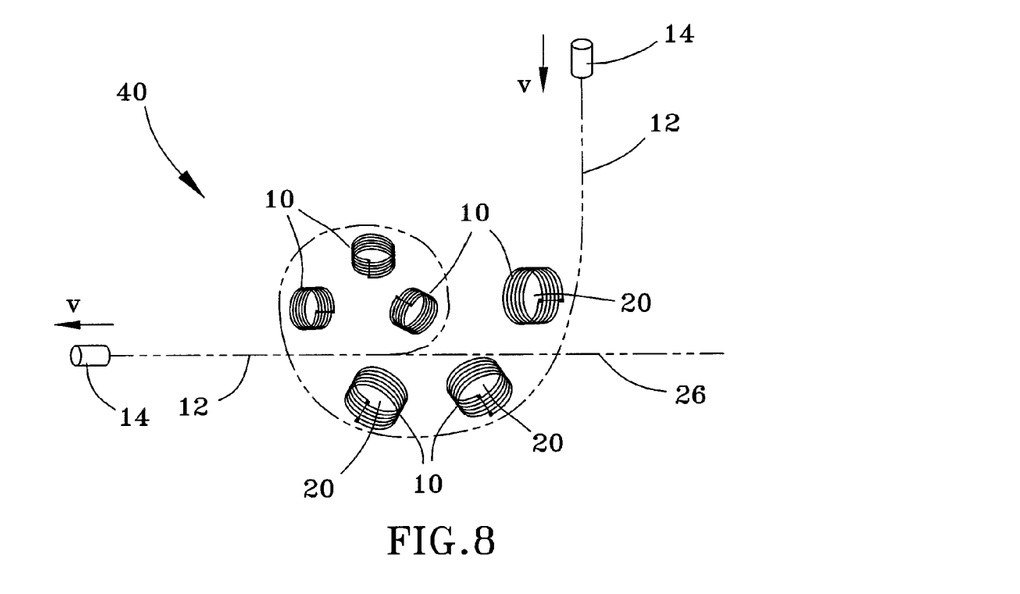
Figure 9:
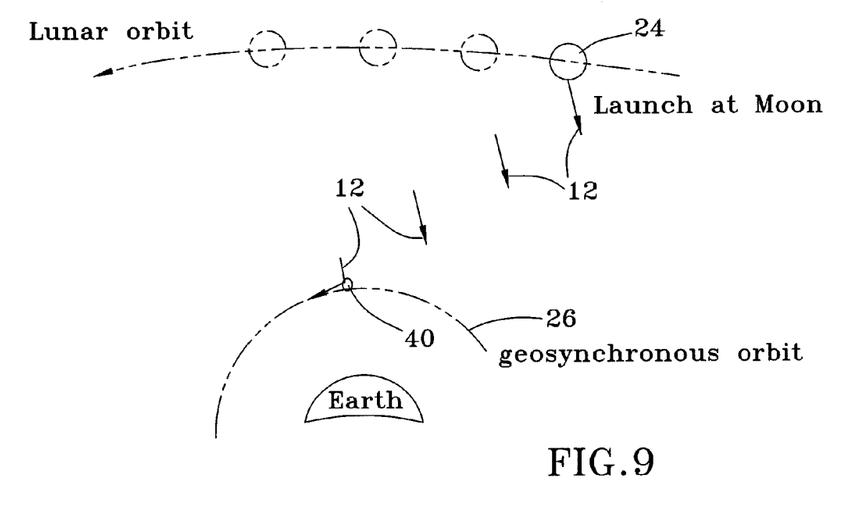
FIG. 9 depicts a capture scheme that can be performed in accordance with the embodiments of FIGS. 7 and 8.

With further reference to FIGS. 7 through 11, magnetic fields placed along a curved path can be employed to modify the velocity vector of the payload 14, for example, to deflect a payload launched from the Moon into a geosynchronous orbit as represented by FIG. 9. The principles of such a velocity modification are represented in FIG. 7, which shows an apparatus 40 comprising a first coil 10 generating a magnetic field at an approximately right angle to the incoming trajectory 12 of the payload 14. With this configuration, the trajectory 12 of the payload 14 can be bent or turned to a more desirable direction. The payload 14 passes across the opening 20 of the first coil 10, oriented so that its magnetic field pulls the payload 14 toward the coil 10 so as to change the trajectory 12 of the payload 14. Anticipating this effect, a second coil 10 is favorably positioned so that it further bends the payload trajectory 12. By using a sufficiently large individual coil 10 or an appropriate number of smaller coils 10, an incoming payload 14 can be shifted through a turn of any desired amount. As evident from FIG. 7, the axes of the coils 10 are aligned as radii of a circle, the trajectory 12 lies along the radially-outward ends of the coils 10, and the magnetic fields of the coils 10 pull the payload 14 toward the coils 10. Alternatively, the trajectory 12 could lie along the radially-inward side of the coils 10, such that the magnetic fields cooperate to push the payload 14 away from the coils 10. FIG. 8 represents deflecting a payload 14 through a rotation to not only align the payload 14 with a desired orbit, but to also draw kinetic energy from the payload 14 and thereby reduce its speed. Instead of being aligned in a circular arrangement, the axes of the coils 10 could be aligned as radii of a spiral. Such a configuration is represented in FIG. 8, which shows the payload trajectory 12 as being bent through 450 degrees with six coils 10. It is foreseeable that any number of coils 10 could be employed to bend the trajectory of a payload through essentially any curvilinear path.

With further reference to FIGS. 7 through 11, magnetic fields placed along a curved path can be employed to modify the velocity vector of the payload 14, for example, to deflect a payload launched from the Moon into a geosynchronous orbit as represented by FIG. 9. The principles of such a velocity modification are represented in FIG. 7, which shows an apparatus 40 comprising a first coil 10 generating a magnetic field at an approximately right angle to the incoming trajectory 12 of the payload 14. With this configuration, the trajectory 12 of the payload 14 can be bent or turned to a more desirable direction. The payload 14 passes across the opening 20 of the first coil 10, oriented so that its magnetic field pulls the payload 14 toward the coil 10 so as to change the trajectory 12 of the payload 14. Anticipating this effect, a second coil 10 is favorably positioned so that it further bends the payload trajectory 12. By using a sufficiently large individual coil 10 or an appropriate number of smaller coils 10, an incoming payload 14 can be shifted through a turn of any desired amount. As evident from FIG. 7, the axes of the coils 10 are aligned as radii of a circle, the trajectory 12 lies along the radially-outward ends of the coils 10, and the magnetic fields of the coils 10 pull the payload 14 toward the coils 10. Alternatively, the trajectory 12 could lie along the radially-inward side of the coils 10, such that the magnetic fields cooperate to push the payload 14 away from the coils 10. For example, FIG. 8 represents deflecting a payload 14 through a rotation to not only align the payload 14 with a desired orbit, but to also draw kinetic energy from the payload 14 and thereby reduce its speed. Instead of being aligned in a circular arrangement, the axes of the coils 10 could be aligned as radii of a spiral. Such a configuration is represented in FIG. 8, which shows the payload trajectory 12 as being bent through 450 degrees with six coils 10. It is foreseeable that any number of coils 10 could be employed to bend the trajectory of a payload through essentially any curvilinear path.

Various types of payloads 14 can be maneuvered in the manners represented in the Figures. By configuring the payload 14 to hold a static electric charge, its trajectory 12 is bent through the Lorentz force $$F=qv\times B$$

where v is the velocity vector of the charged body, B is the magnetic field tensor, and X is the cross product operator that acts at right angles to two vectors: the electric charge q and the vector with the direction of the force F. Using the Lorentz force on a charged payload, or similarly by using just magnetic force on a ferrous or electromagnetic payload, the direction of the payload's trajectory 12 can be altered with relatively small amounts of kinetic energy change. This can be used to great advantage in a certain configuration of orbital transfer. For example, consider again the Moon launch scenario of FIG. 3 and an alternative scenario depicted in FIG. 9. In the latter scenario, a payload launcher on the Moon 24 has aimed the payload 14 such that the payload 14 arrives at some angle to a desired orbit, here depicted as the GEO 26. In this case, orbital transfer involves redirecting the trajectory 12 of the payload 14 to align with GEO 26. As depicted in FIG. 9, the launch from the Moon 24 is realigned to GEO 26 with, for example, an apparatus 40 of the type depicted in FIGS. 7 and 8, whose coils (not shown) induce a significant bend in the velocity vector arrow 12 just prior to encountering GEO 26. This capture scheme can be extended in the general case to nearly any angle. This configuration is very energy efficient, as there is very little wasted energy. By setting the Moon launch velocity equal to, or slightly greater than, the orbital velocity at GEO, bending the trajectory with the Lorentz velocity deflection technique as represented in FIG. 9 can be used to bring a payload 14 into precise geosynchronous orbit. This capture scheme, though represented as occurring at ninety degrees, can be greater or less than ninety degrees by a sizeable amount. However, for simplicity of visualization and distinction from the scheme represented in FIG. 3, the scheme represented in FIG. 9 can be generally considered a perpendicular arrival of the payload 14 at the target orbit, and then a right-angle bend to adjust the trajectory 12.

FIGS. 10 and 11 schematically depict a control system 42 and components for performing payload deflection with an apparatus 40 of the type represented in FIGS. 7 through 9. Together, the control system 42 and components preferably provide a wireless control system and feedback loop for minimizing errors and for on-the-fly modifications and/or adjustments to accommodate individual payload differences in momentum, velocity, and even material properties. Considering for simplicity a single coil 10, a payload velocity and position sensor 44 is positioned along and near the intended trajectory 12 of the payload 14 and a coil field sensor 46 is positioned near the coil 10 to provide instant feedback for control circuits 48 of the control system 42. The control circuits 48 make minor adjustments to the attitude control of the coil 10, or the current profile through the coil 10, or the position of a subsequent coil (not shown), as may be appropriate. Information 50 from the launch can be used to preposition the coil 10, sensors 44 and 46, and other equipment and preset the control parameters to nominal values. However, through rapid processing, further fine-tuning adjustments can be made dynamically and possibly in real-time, thereby increasing the control over the final trajectory 12.

While embodiments of the present invention described herein include examples of payload catchers and general orbital transfers, the principles of the invention can be applied to further applications, making the invention a versatile and important space technology. For example, through the use of multiple coils 10 or coil assemblages 28, acceleration and deceleration forces can be minimized, making this technology suitable for human transportation. A series of such coils 10 (or coil assemblages 28) could be used to accelerate and decelerate many types of payloads, vessels, vehicles, and other cargo. Energy efficiency is enhanced by the ability to store electrical power, and versatility is provided by the current control and attitude thrusters. Thus, a collection of these apparatuses could be used to distribute a wide range of traffic throughout a large region of space. Both payload cargo or manned vessels could be processed using the same equipment. Inter-orbital transfers with modest delta-v requirements could be handled exclusively through electromagnetic acceleration and deceleration. A given installation could even be modified, merely by repositioning the apparatus, to operate either in the ID configuration (FIGS. 1 through 3) or Lorentz force configuration (FIGS. 7 through 10).

The rapidity with which the coils 10 can be readied for a subsequent payload operation is dependent upon many factors, such as the available storage capacity and the power-generating capability of solar cells, plus the efficiency by which kinetic energy of motion is transferred to electrical energy and vice versa. As represented in the Figures, a multitude of configurations are envisioned for the coils 10, e.g., a linear arrangement where a payload is accelerated and decelerated along a substantially linear line, or a collection of coils in a spiral with the intent of reducing and re-directing the velocity of a payload. A combination of linear and circular motion might also be used to provide certain advantages not realized with either configuration alone.

The coil configurations represented in the Figures depict only one of several geometries of wire that give rise to a magnetic field suitable for carrying out the invention. Even a single loop, whether circular, oval, or in the shape of a polygon generates a magnetic field. Simple coils are an especially efficient way to increase the magnetic field for a given current, though it may be found advantageous to vary the area of the coils along their length. For example, a tapered cylinder (conical section) might provide good performance in bringing a moving projectile quickly and accurately to a specific point of zero relative velocity.

In view of the above, the present invention provides apparatuses and methods for altering the velocity and/or trajectory of an object carrying an electric charge, an adjustable or permanent magnetic field, or a magnetizable material (such as iron) in zero or low-gravity environments. The coils that perform these functions can be arrayed in a linear or a curvilinear fashion, and operated inductively or using Lorentz forces, depending on the desired performance requirements. In the general case, an apparatus in accordance with the invention may have an alternating or repeating operating pattern in which both linear deceleration and path deflection are performed, so that speed can be reduced and velocity direction redirected as desired. Control circuitry, guided by suitable sensors, can be used to adjust and adapt the attitude and current profiles of the coils to optimally modify the desired final velocity of a payload. Energy stored that may be gained from a previous capture or deflection can be supplemented with solar cell power to provide the coil current needed to capture or deflect the next object. These coils can be used within a large range of power levels to decelerate, redirect and even accelerate objects, making this a general purpose orbital transfer technology superior in many ways to rocketry. Advantages in efficiency, control, flexible design, and low-maintenance operation make this invention highly desirable for use in a thriving cislunar economy and a foundation for transportation and commerce in outer space.

While the invention has been described in terms of a preferred embodiment, it is apparent that other forms could be adopted by one skilled in the art. Therefore, the scope of the invention is to be limited only by the following claims.

What is claimed is:

1. An apparatus in a zero or low-gravity environment, the apparatus comprising:
    means for generating a magnetic field in proximity to an orbital path in the zero or low-gravity environment; and
    an object moving in proximity to the generating means and having a trajectory and speed, the object being sufficiently close to the generating means such that the magnetic field alters at least one of the trajectory and speed of the object to selectively inject the object into orbit along the orbital path or eject the object from the orbital path;
    wherein the generating means defines an opening of sufficient size to enable the object to move through the opening, and the generating means is configured for passage of the object completely through the generating means.

2. The apparatus according to claim 1, wherein the object contains a ferrous material or an electromagnet or holds a static charge.

3. The apparatus according to claim 1, wherein the generating means is operable to decelerate the object.

4. The apparatus according to claim 1, wherein the generating means is operable to accelerate the object.

5. The apparatus according to claim 1, wherein the generating means comprises at least one coil.

6. The apparatus according to claim 1, wherein the generating means comprises a plurality of concentrically aligned coils, each of the concentrically-aligned coils generating a magnetic field that alters the speed of the object.

7. The apparatus according to claim 6, wherein the concentrically-aligned coils have decreasing sizes in one direction of their concentric alignment.

8. The apparatus according to claim 1, wherein the generating means comprises means for controlling the attitude of the generating means relative to the object.

9. The apparatus according to claim 1, wherein the generating means comprises means for receiving and sending communications.

10. The apparatus according to claim 1, wherein the generating means comprises:
    means for receiving and sending communications; and
    means for controlling the attitude of the generating means relative to the object in response to the communications received by the receiving and sending means.

11. The apparatus according to claim 1, wherein the generating means comprises means for capturing and storing energy of a back-emf pulse created as the object enters the magnetic field generated by the generating means.

12. The apparatus according to claim 1, wherein the generating means comprises means for capturing and storing solar energy.

13. An apparatus in a zero or low-gravity environment, the apparatus comprising:
    means for generating a magnetic field in proximity to an orbital path in the zero or low-gravity environment; and
    an object moving in proximity to the generating means and having a trajectory and speed, the object being sufficiently close to the generating means such that the magnetic field alters at least one of the trajectory and speed of the object to selectively inject the object into orbit along the orbital path or eject the object from the orbital path;
    wherein the generating means comprises a coil that defines an opening and the coil is operable to alter only the trajectory of the object as the object moves past but not through the opening.

14. An apparatus in a zero or low-gravity environment, the apparatus comprising:
    means for generating a magnetic field in proximity to an orbital path in the zero or low-gravity environment; and
    an object moving in proximity to the generating means and having a trajectory and speed, the object being sufficiently close to the generating means such that the magnetic field alters at least one of the trajectory and speed of the object to selectively inject the object into orbit along the orbital path or eject the object from the orbital path;
    wherein the generating means comprises a plurality of coils aligned along an arcuate path, each of the arcuately-aligned coils generating a magnetic field that alters at least the trajectory of the object.

15. The apparatus according to claim 14, wherein each of the arcuately-aligned coils has an axis, the axes of the arcuately-aligned coils are aligned as radii of a circle, and the magnetic fields of the arcuately-aligned coils push the object away from the arcuately-aligned coils or pull the object toward the arcuately-aligned coils.

16. The apparatus according to claim 14, wherein each of the arcuately-aligned coils has an axis, the axes of the arcuately-aligned coils are aligned as radii of a spiral, and the magnetic fields of the arcuately-aligned coils push the object away from the arcuately-aligned coils or pull the object toward the arcuately-aligned coils.

17. An apparatus for maneuvering an object having a trajectory and speed in a zero or low-gravity environment, the apparatus comprising:
a plurality of coils aligned, separated, and spaced apart from each other along a path, each coil generating a magnetic field in the zero or low-gravity environment; and
wherein the coils are oriented and spaced along the path so that their magnetic fields cooperate to alter the trajectory and speed of the object as the object moves in proximity to the path.

18. The apparatus according to claim 17, wherein at least some of the coils are concentrically aligned, each of the concentrically-aligned coils defines an opening of sufficient size to enable the object to move through the opening, and the apparatus alters the speed of the object as the object successively passes through the openings of the concentrically-aligned coils.

19. The apparatus according to claim 18, wherein at least a portion of the path is an orbital path.

20. The apparatus according to claim 18, wherein the apparatus further comprises means for capturing and storing energy of a back-emf pulse created as the object enters the magnetic fields generated by the concentrically-aligned coils.

21. The apparatus according to claim 17, wherein at least some of the coils are aligned along an arcuate path, each of the arcuately-aligned coils has an axis, the axes of the arcuately-aligned coils are aligned as radii of a circle, and the magnetic fields of the arcuately-aligned coils push the object away from the arcuately-aligned coils or pull the object toward the arcuately-aligned coils so as to alter the trajectory of the object.

22. The apparatus according to claim 17, wherein at least some of the coils are aligned along an arcuate path, each of the arcuately-aligned coils has an axis, the axes of the arcuately-aligned coils are aligned as radii of a spiral, and the magnetic fields of the arcuately-aligned coils push the object away from the arcuately-aligned coils or pull the object toward the arcuately-aligned coils so as to alter the trajectory of the object.

23. A method of transferring an object to an orbital path in a zero or low-gravity environment, the method comprising the steps of:
generating a magnetic field in proximity to the orbital path; and
causing the object to move with a trajectory and speed in proximity to the magnetic field, the object being sufficiently close to the magnetic field such that the magnetic field alters at least one of the trajectory and speed of the object to inject the object into orbit along the orbital path; and
capturing and storing energy of a back-emf pulse created as the object enters the magnetic field.

24. The method according to claim 23, wherein the magnetic field is generated by at least one coil defining an opening and the magnetic field alters the speed of the object as the object moves through the opening.

25. The method according to claim 24, wherein the magnetic field decelerates the object.

26. The method according to claim 23, further comprising the step of accelerating the object with the magnetic field to cause the object to leave the orbital path.

27. The method according to claim 23, wherein a plurality of magnetic fields are generated by a plurality of concentrically aligned coils, each of the concentrically-aligned coils generating a magnetic field that alters the speed of the object to inject the object into orbit along the orbital path.

28. The method according to claim 27, wherein the concentrically-aligned coils have decreasing sizes in one direction of their concentric alignment.

29. The method according to claim 23, further comprising the step of controlling the orientation of the magnetic field relative to the object.

30. The method according to claim 23, further comprising the steps:
receiving and sending communications; and
controlling the orientation of the magnetic field relative to the object in response to the received communications.

31. The method according to claim 23, further comprising the step of capturing and storing solar energy.

32. A method of maneuvering an object in a zero or low-gravity environment, the method comprising the steps of:
generating a magnetic field in the zero or low-gravity environment, wherein the magnetic field is generated by at least one coil defining an opening and
causing the object to move with a trajectory and speed in proximity to the magnetic field, the object being sufficiently close to the magnetic field such that the magnetic field alters the trajectory of the object as the object moves past but not through the opening.

33. The method according to claim 32, wherein a plurality of magnetic fields are generated by a plurality of coils aligned along an arcuate path, each of the arcuately-aligned coils generating a magnetic field that alters at least the trajectory of the object as the object moves past but not through openings of the arcuately-aligned coils.

34. The method according to claim 33, wherein each of the arcuately-aligned coils has an axis, the axes of the arcuately-aligned coils are aligned as radii of a circle, and the magnetic fields of the arcuately-aligned coils push the object away from the arcuately-aligned coils or pull the object toward the arcuately-aligned coils.

35. The method according to claim 33, wherein each of the arcuately-aligned coils has an axis, the axes of the arcuately-aligned coils are aligned as radii of a spiral, and the magnetic fields of the arcuately-aligned coils push the object away from the arcuately-aligned coils or pull the object toward the arcuately-aligned coils.

36. A method of maneuvering an object having a trajectory and speed in a zero or low-gravity environment, the method comprising the steps of:
providing a plurality of coils aligned, separated, and spaced apart from each other, each coil generating a magnetic field in the zero or low-gravity environment; and
causing the object to move in proximity to each of the coils, the object passing sufficiently close to each of the coils such that the magnetic fields thereof cooperate to alter the trajectory and speed of the object.

37. The method according to claim 36, wherein at least some of the coils are concentrically aligned, each of the concentrically-aligned coils defines an opening of sufficient size to enable the object to move through the opening, and the speed of the object is altered as the object passes successively through the openings of the concentrically-aligned coils.

38. The method according to claim 37, wherein the causing step injects the object into orbit along an orbital path.

39. The method according to claim 38, further comprising the steps of:
capturing and storing energy of a back-emf pulse created as the object enters the magnetic field of each of the coils; and
ejecting the object from the orbital path with the coils using the energy.

40. The method according to claim 38, wherein at least some of the coils are aligned along an arcuate path, each of the arcuately-aligned coils has an axis, the axes of the arcuately-aligned coils are aligned as radii of a circle, and the magnetic fields of the arcuately-aligned coils push the object away from the arcuately-aligned coils or pull the object toward the arcuately-aligned coils so as to alter the trajectory of the object.

41. The method according to claim 38, wherein at least some of the coils are aligned along an arcuate path, each of the arcuately-aligned coils has an axis, the axes of the arcuately-aligned coils are aligned as radii of a spiral, and the magnetic fields of the arcuately-aligned coils push the object away from the arcuately-aligned coils or pull the object toward the arcuately-aligned coils so as to alter the trajectory of the object.

* * * * *